US007474205B2

(12) United States Patent
Trela (10) Patent No.: US 7,474,205 B2
(45) Date of Patent: Jan. 6, 2009

(54) STAND-OFF VEHICLE UNDER-CARRIAGE INSPECTION AND DETECTION SYSTEM FOR DETERRING VEHICLE BOMBERS FROM A SAFE STAND-OFF DISTANCE

(76) Inventor: Richard Steven Trela, 100 Pierce St. # 1101, Clearwater, FL (US) 33756

(*) Notice: Subject to any disclaimer, the term of this patent is extended or adjusted under 35 U.S.C. 154(b) by 128 days.

(21) Appl. No.: 11/090,548

(22) Filed: Mar. 24, 2005

(65) Prior Publication Data
US 2005/0270373 A1 Dec. 8, 2005

Related U.S. Application Data

(60) Provisional application No. 60/555,760, filed on Mar. 24, 2004.

(51) Int. Cl.
*G08B 1/08* (2006.01)
*H04Q 7/00* (2006.01)
(52) U.S. Cl. .................................. 340/539.1; 340/825
(58) Field of Classification Search ............... 340/539.1
See application file for complete search history.

(56) References Cited

U.S. PATENT DOCUMENTS

| 6,249,567 | B1 * | 6/2001 | Rothschild et al. ............ 378/88 |
| 6,856,344 | B2 * | 2/2005 | Franz ......................... 348/143 |
| 7,102,665 | B1 * | 9/2006 | Chandler et al. ............. 348/148 |
| 2003/0193818 | A1 * | 10/2003 | Grothe et al. ............... 362/559 |
| 2003/0222789 | A1 * | 12/2003 | Polyakov ............... 340/870.16 |

FOREIGN PATENT DOCUMENTS

GB 2271483 A * 4/1994

* cited by examiner

*Primary Examiner*—Benjamin C. Lee
*Assistant Examiner*—Travis R. Hunnings (57) ABSTRACT

A military and homeland security anti-terrorism security checkpoint machine, system and method of detecting and deterring terrorist infiltrations or attacks by vehicle bombs upon entry into high risk locations. The described invention provides a means to safeguard security checkpoint personnel, by allowing an inspection of the undercarriage of the vehicles approaching a security checkpoint to occur from a remote machine a safe stand-off distance away. Via the strategic use of a combination of machines, security actions and methods of inspection all calculated to isolate suspicious reactions and behavior, security officers can better evaluate the intent of persons approaching the checkpoint from a safe distance away as well as review in real-time, a high quality digital video image of the full undercarriage of the vehicle upon as it drives over the machine. Additionally, supporting communications equipment and systems are employed in the use of the present invention that allows real-time communication between the vehicle and the stand-off security personnel, which can be useful in isolating suspicious behavior in persons entering a facility, while still a safe stand-off distance away. Digital image storage of the under-carriages of entering cars can be utilized for security training or proof of diligence in security procedures for legal and insurance purposes as well.

1 Claim, 10 Drawing Sheets

FIGURE 10

STAND-OFF VEHICLE UNDER-CARRIAGE INSPECTION AND DETECTION SYSTEM FOR DETERRING VEHICLE BOMBERS FROM A SAFE STAND-OFF DISTANCE

CROSS REFERENCE TO RELATED APPLICATIONS

This application is entitled to the benefit of Provisional Patent Application No. 60/555,760 Mar. 24, 2004.

STATEMENT REGARDING FEDERALLY SPONSORED RESEARCH AND DEVELOPMENT

Not Applicable

BACKGROUND OF THE INVENTION

This invention generally relates to military and homeland security anti-terrorism security checkpoint systems and methods for detecting and deterring terrorist infiltrations or attacks upon entry into high risk locations. More specifically, a means to safeguard security personnel, by allowing an inspection of the undercarriage of vehicles approaching a security checkpoint to occur from a remote machine, a safe stand-off distance away. Via the strategic use of a combination of machines, security actions and methods of inspection calculated to isolate suspicious reactions and behavior, security officers can better evaluate the intent of persons approaching the checkpoint from a safe distance away. Additionally, supporting communications equipment and systems are employed in the use of the present invention that allows real-time communication between the vehicle and the stand-off security personnel which is used in controlling traffic from a safe stand-off distance away.

DISCUSSION OF THE RELATED ART

Prior art examples will be found to be limited as this invention answers major problems our culture has recently inherited due to the increased use of vehicles as a means of transporting explosives or other contraband up to or into a facility for the purposes of exploding it at it's vehicle checkpoint or having breached that, inside the facility.

Car Bombs: Trying to Stop the Terrorist's Low Tech Lethal Weapon of Choice By Samantha Levine They are alarmingly simple and frighteningly deadly. And so terrorists have long viewed vehicle bombs as "one of the best tools to breach security," warned the FBI and Department of Homeland Security on July 30. Two days later, DHS Secretary Tom Ridge put several financial institutions on high alert, citing al Qaeda chatter about using truck bombs to hit icons of America's financial might. Such warnings bring with them horrifying memories, like the 241 people killed at a Marine barracks in Beirut when a bomb-wired Mercedes truck exploded there in October 1983. Or the 168 Americans who perished on Apr. 19, 1995, in the blast of a truck bomb in Oklahoma City. Or the near-simultaneous August 1998 bombings of the U.S. embassies in Kenya and Tanzania that left 225 dead. But as the threat of vehicle bombs persists, so does the daunting problem of how to protect against them. The simplicity and stealth of these weapons make them a complex foe. It's virtually impossible to screen all the cars and trucks that rumble past critical buildings. So authorities now use simple tools, such as restricting parking and traffic and putting up concrete median barriers and security checkpoints. "Distance is our friend," says Michael Bouchard, assistant director of field operations for the Bureau of Alcohol, Tobacco, Firearms, and Explosives (ATF). "The farther away vehicles are from buildings, the better off you are."

Terrorism Changes the Face of Washington from Trash cans to Barricades it's a Vigilant Mind-Set By Mike Soraghan, Denver Post Washington Bureau, WASHINGTON—'September 11, it seems, was a line of demarcation between more easy, carefree times and now a more vigilant time,' said Cheryl Johnson, a spokeswoman for the Washington Metropolitan Area Transit Authority, which runs the subway. 'People can't hear an airplane or a helicopter without wondering, 'What is that?'' Washingtonians now run a daily gantlet of closed streets, concrete barriers, idling police cars and security officers pushing mirrors under cars. There are new X-ray machines in buildings and fighter jets overhead. For D.C.-area residents, the traffic jams and delays caused by the attacks offer a mixture of fiustration and reassurance. And there's a recognition that some freedoms have been lost. 'On one hand, you're inconvenienced,' said Chris Changery, a former Senate staffer turned consultant, who's finding it tougher to get around Capitol Hill. 'Then there's a part of you that asks, 'Why couldn't we do this in the first place?'' In doing away with trash cans and in sliding mirrors beneath cars, Washington is using methods long familiar to European nations. With today's necessary changes in homeland security procedures at government buildings as well as public gathering places, an the need to provide a fast reliable means of inspecting vehicles at points of entry to our nations public gathering places has long been needed worldwide, but now is vitally needed in our own nation. Currently, security and law enforcement personnel have to rely on hand held mirrors for under car inspections that are difficult to handle with accuracy and provide no means to store and review the inspection, are subject to weather related problems, human observation limitations and requires the attending security officers to potentially pass on reporting suspicious vehicles and drivers due to the need to maintain an efficiency in traffic movement.

BRIEF SUMMARY OF THE INVENTION

The present invention provides a new way for high quality digital video vehicle under-carriage inspections to be conducted from a safe stand-off distance away from a security checkpoint or facility entrance. With suicide bombers becoming more emboldened to the point of actually blowing up their vehicle at a security checkpoint, the problem of how to begin the process of determining whether the approaching vehicle is loaded with an explosive device, hazardous objects, or even hidden persons under a truck chassis well before they reach the checkpoint, and at a safe standoff distance away, is vitally needed. The present invention describes an effective means to do just that. Additionally, the system being equipped with a gamma and radiological substance detection and alert system can also alert security personnel to the existence of a dirty bomb from a safe standoff distance as well. The present invention also describes a vital new safety system that signals a car to stop well over a half a mile away using a laser-assisted traffic signal designed to signal cars to "stop" and "go", by the use of a specially designed distance green and red laser signal light assemblies. This new invention was born out of the need that occurred recently wherein security officers in a war zone in IRAQ, tried to signal an approaching speeding car by hand signals to stop. When it didn't, they fired on the vehicle and mistakenly shot a friendly nation security official who was just fleeing from the enemy.

U.S. Army

US forces said they shot at the speeding convoy after it failed to stop at a roadblock near Baghdad airport. "About 9 pm, a patrol in western Baghdad observed the vehicle speeding towards their checkpoint and attempted to warn the driver to stop by hand and arm signals, flashing white lights, and firing warning shots in front of the car," the US Army said.

As will be seen in the described present invention specifications this vital component to the security checkpoint system may very well have enabled the car to be halted well before the necessity of having to shoot at it.

Until now, security officers have had to rely on mirrors-on-sticks to inspect the undercarriages of vehicles entering a facility. This has proven to be highly ineffective and lethal. In August of 2003 14 people were killed and 148 people were injured when a security officer missed finding a bomb under a vehicle during an undercarriage inspection using a mirror on a stick and let it drive on into the facility at a Jakarta Marriott Hotel.

CBS News—14 Killed in Jakarta Car Bombing

JAKARTA—World leaders condemned Tuesday's deadly bomb attack on a downtown Jakarta hotel, calling it a "deplorable attack on innocent civilians." At least 14 people were killed and 148 injured in what the governor called a likely suicide attack on the American-run Marriott Hotel. As the view-ability of a mirror is greatly inferior to the high quality image produced by the current invention, along with the standoff capabilities designed into the system its, use may very well prevent another such occurrence. And in light of the fact using a mirror on a stick to inspect a car requires a security guard to be right at the car for inspection, combined with the fact that terrorists are actually blowing up the checkpoints themselves, the present invention offers a vital new safety feature which is a must in today's vehicle inspection process—standoff inspection. The present invention describes a fully self-contained machine it's component parts, and a system of digitally inspecting the under-carriage of a vehicle, and then transmitting it to a remote command station for a high quality remote video inspection of that vehicles' under-carriage, conducted well away from the vehicle. In addition to it's stand-off capabilities, the system can be used to inspect cars leaving a facility for theft of materials or escape of persons hidden underneath a vehicle. Also included in the system is a radiological detection system that alerts security officers to the presence of a dirty bomb from a safe stand off distance from the facility as well.

OBJECTS OF THE INVENTION

Security and law enforcement personnel can utilize this vital new invention to record the entire process of a specific vehicle's under carriage inspection as well enabling the security personnel to note suspicious reactions in drivers and occupants, a safe standoff distance away. Additionally, digital information being processed by the invention that can be highlighted as abnormal can be stored for intelligence review by law enforcement agencies and security personnel.

ADVANTAGES OF THE INVENTION

The overwhelming immediate acceptance by law enforcement agencies of the current invention has validated the fact that there has been a strong long felt need for an efficient and convenient method to process vehicles entering into high risk areas through security checkpoints with greater regard for accuracy and attention to detail as well as providing a way for law enforcement agencies to cooperate together to form a stronger more organized effort in matters concerning handing terrorists threats against our homeland. The current invention provides many new and unique advantages for law enforcement officials over earlier security procedures that were as varied as each location, and as well, were only as good as the observation capabilities and training of the personnel doing the inspecting. A vast majority of our nations security checkpoints are vulnerable to penetration by terrorists on many levels. Lack of personnel, human confront capabilities against evil vary widely between individuals allowing possible "look the other way" tendencies, lack of training, lack of communication, and countless other problems plague our nations security checkpoints that are directly addressed and greatly assisted by the current invention. Indeed, as will be seen in the following pages this invention creates many new opportunities for street level intelligence gathering by our security teams entrusted with security inspections at our nations vital security checkpoints. Another advantage that this invention inherently provides is the ability to quickly train security personnel on procedures that drill expert observation skills on personnel so that they can be alert to suspicious behavior while using the system while on the job. Another advantage to the system is that traffic back-up due to, weather problems such as wind blown sand, rain extreme cold or other environmental factors that may inhibit proper undercarriage screening can now be reviewed from the comfort of a remote base station. Additionally, the events of September $11^{th}$ have created the unforeseen need for insurance companies insuring against terrorism to be able to evaluate risk and document security diligence in mitigating that risk, of terrorist attacks of properties they insure against. With vehicle bombs high on the list of potential risks to an insured facility, this invention answers this problem by providing a high quality digital recording of every under carriage as well as the date and time recording of all vehicles entering the facility.

DETAILED DESCRIPTION OF THE DRAWINGS AND USE OF THE INVENTION

Figure 1:
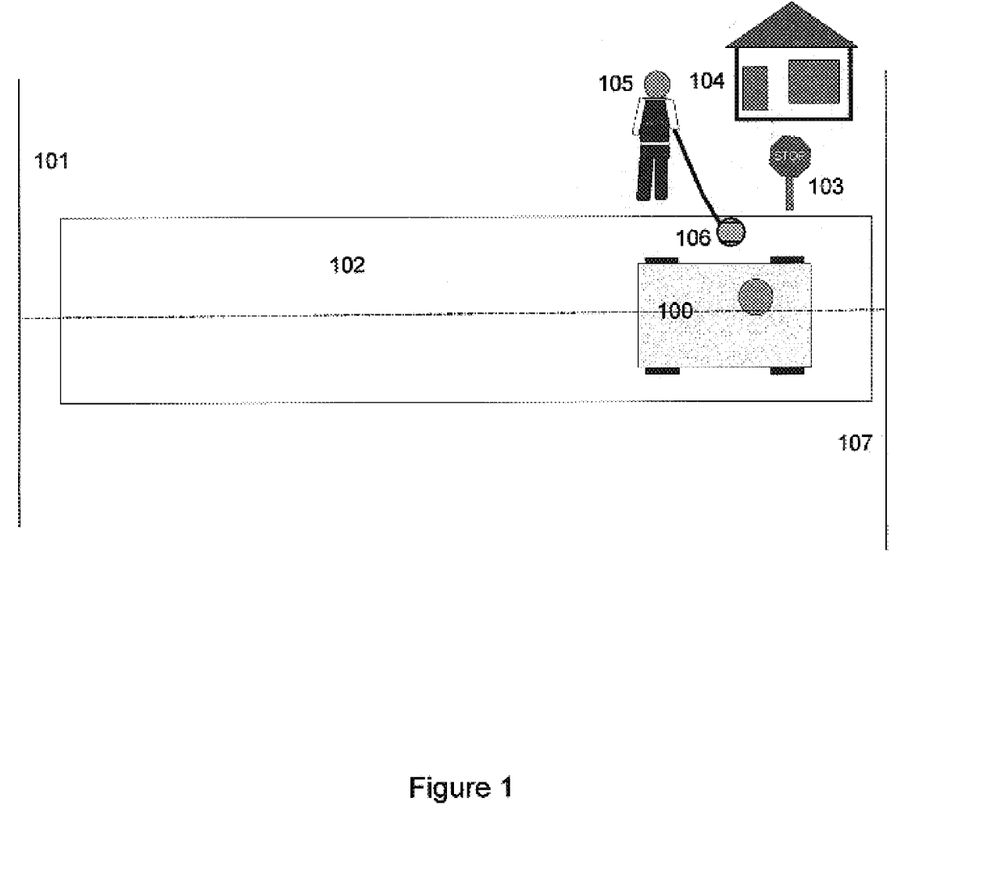
FIG. 1 illustrates a vehicle approaching a security checkpoint in a traditional manner according to the prior art wherein the undercarriage inspection process is done close-up with a mirror on a stick.

Reference is made to FIG. 1 which illustrates a vehicle 100 approaching a security checkpoint 104 and stopping 103 for an inspection in a traditional manner according to the prior art. The line 101 and 107 demarks the safe stand-off distance a passenger car needs to be away if it were to contain explosives and the security guard 105 was to be safe should an explosion occur. Note the illustrations distances are for concept only. (See F.E.M.A. Federal Emergency Management Agency guidelines for safe standoff distances for passenger vehicles carrying explosives). The illustration also shows security guard 105 using a prior art method of a mirror on a stick 106 which creates a risky scenario with standoff distance when in mind. See FIG. 9.

Figure 2:
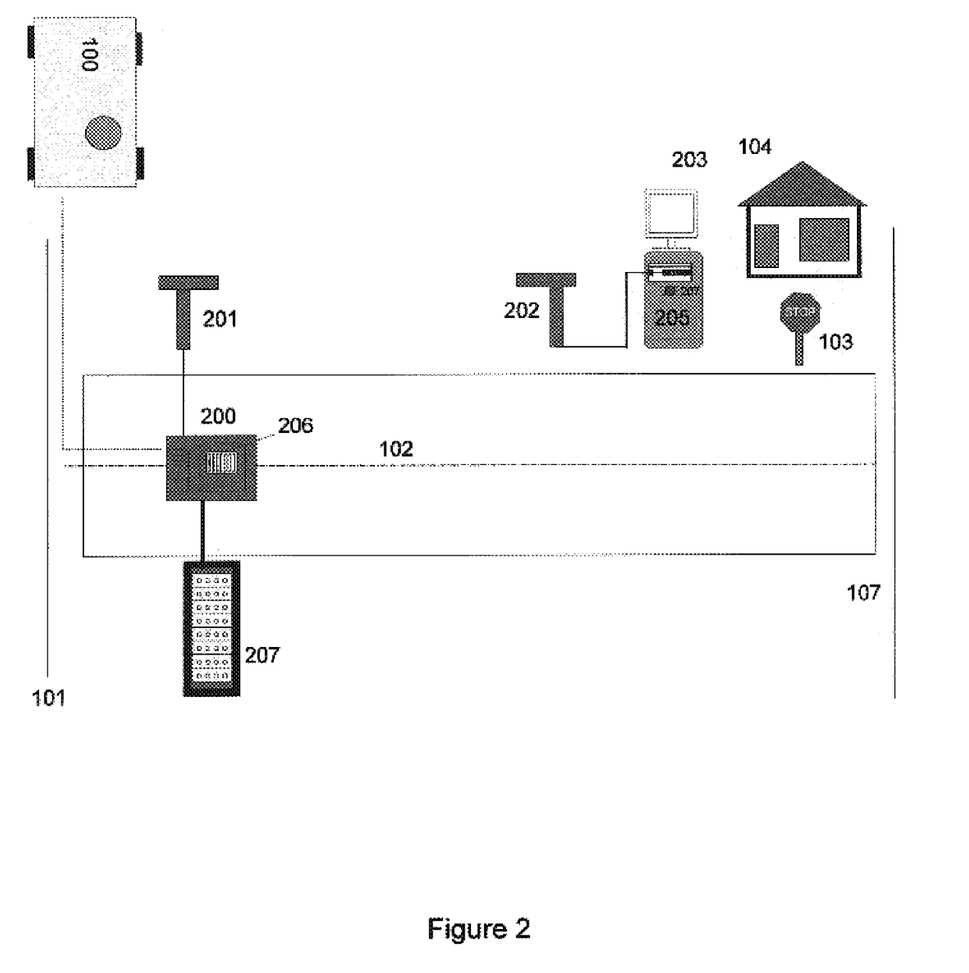
FIG. 2 illustrates the same security checkpoint process utilizing the present invention, the (Remote Chassis Inspection System) R.C.I.S. being charged utilizing solar power which enables it to be used in remote locations without the need for location power.

Reference is now made to FIG. 2 which shows the portion the R.C.I.S system components that deliver the high quality digital image of the undercarriage of entering vehicles to the security guard booth from a safe standoff distance away. The chassis undercarriage scanner 200 is shown connected to a video microwave transmitter (1.2 ghz) Which sends a wireless video transmission across to a wireless receiver 202 which then sends the received image to a digital video recorder player or internet capable computer 205 and shown on viewing screen 203. The illustration further shows the built in radiological detector 206 and alarm which is wired into the audio transmitter of transmitter 201 and which is received at 202 and which then is amplified through DVR 205 and sounded out load as an audio alert played on speaker 207.

Figure 3:
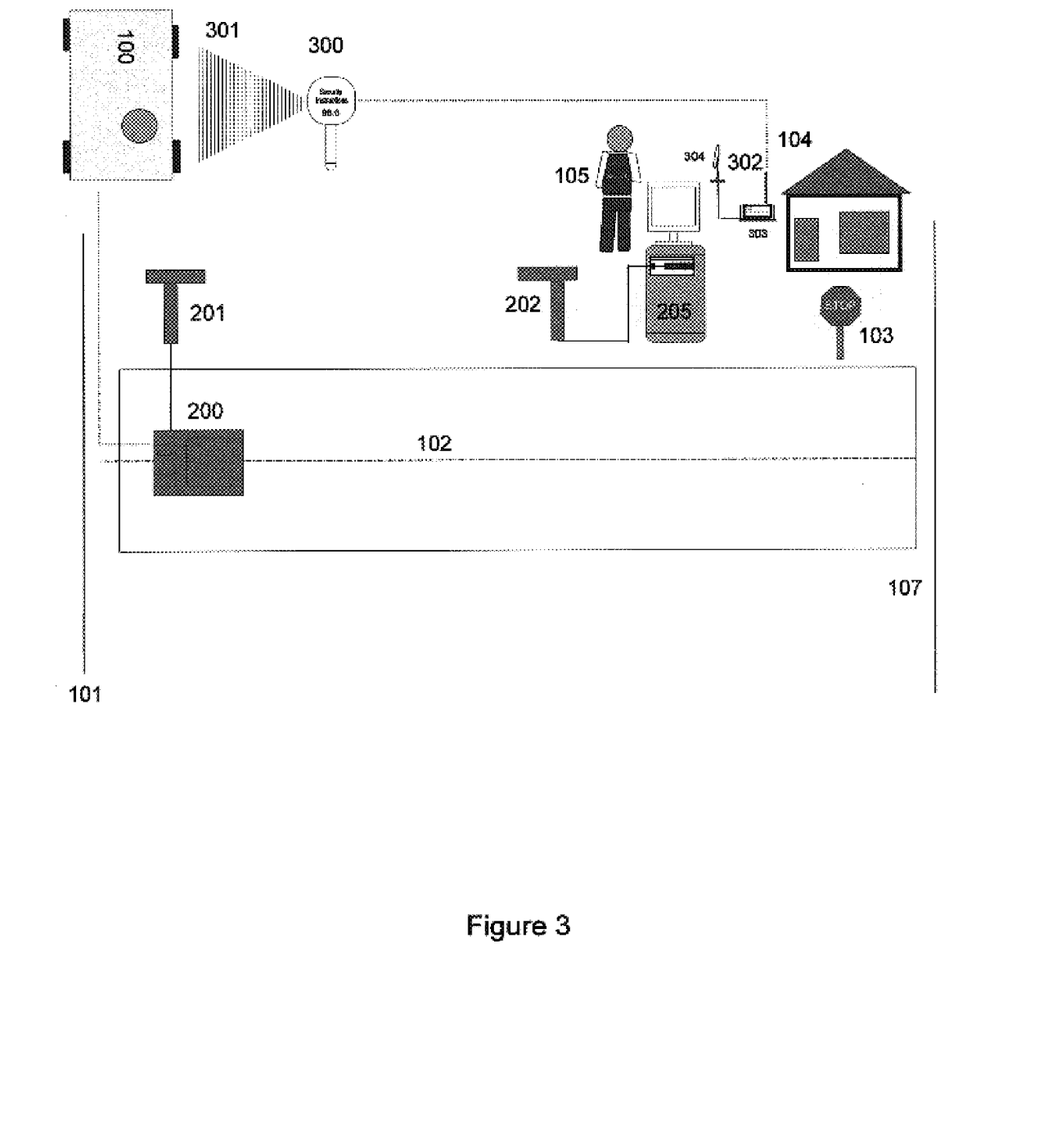
FIG. 3 illustrates the components of the radio security information and driver warning system being charged utilizing solar power which enables it to be used in remote locations without the need for location power.

Reference is now made to FIG. 3 which shows the security radio broadcast portion of the system. The security radio sign 300 indicates to drivers that they can receiver security instructions on their car radio 301. The instructions are pre-recorded on the radio broadcast unit 303 (commercially available) and sent out from the unit on airwave 302 and transmitted to approaching vehicles 301 for their reference and instructions.

Figure 4:
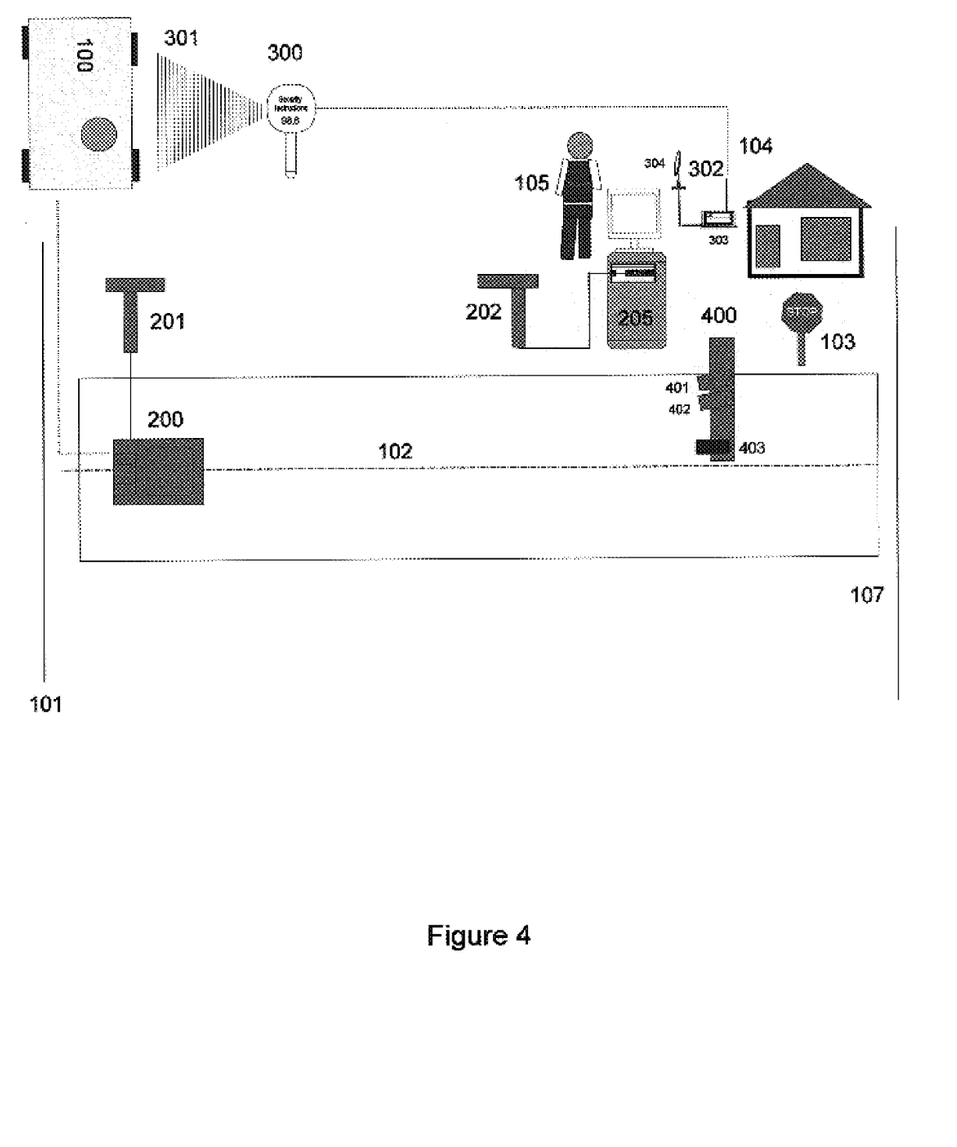
FIG. 4 illustrates the long-range laser traffic signal light system to signal cars up to half a mile away to stop immediately or to proceed forward as O.K.

Reference is now made to FIG. 4 which introduces the long range laser traffic signal system 400 and the long range camera system 403 for long range identification of approaching vehicles and occupants. 401 is the long range laser unit housing for the "RED" laser stop light and 402 is the long range laser unit housing for the "Green" go light.

Figure 5:
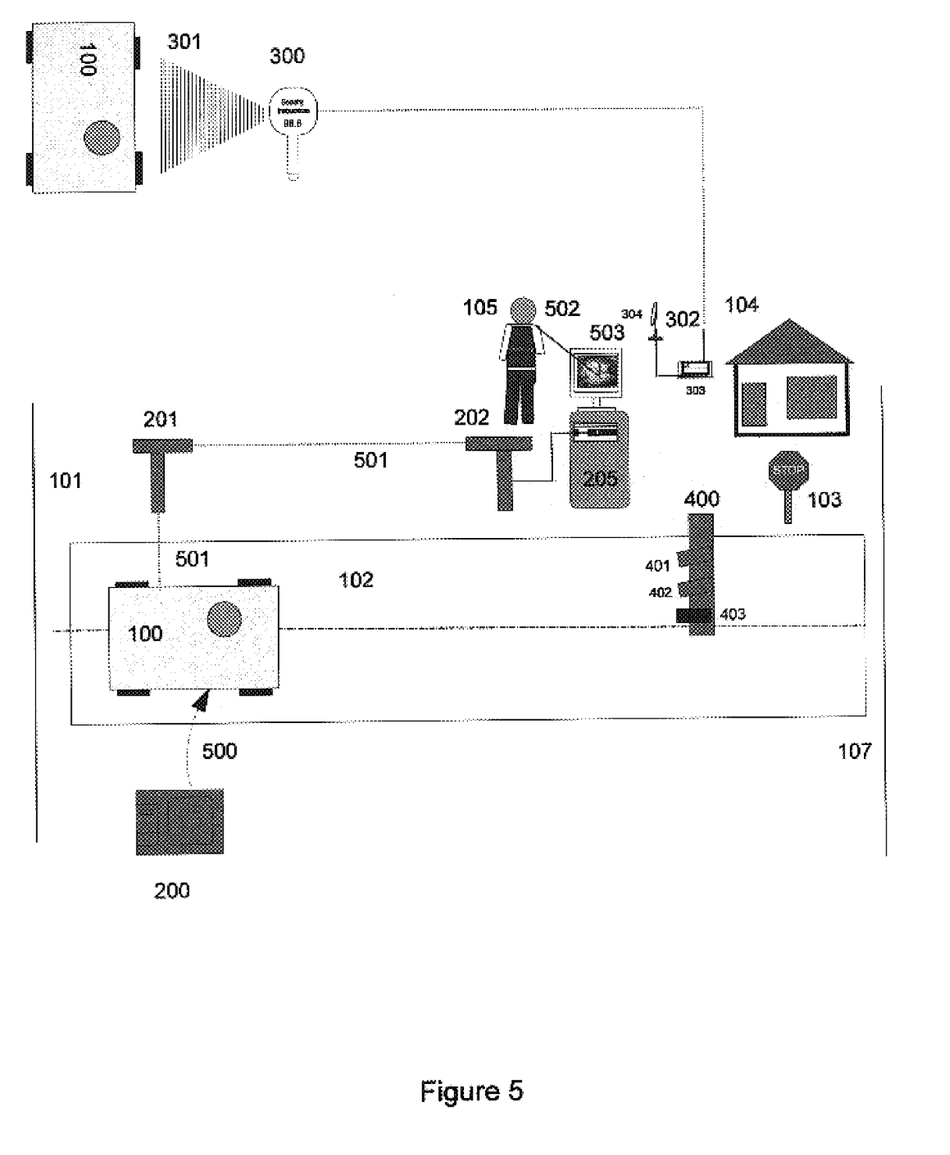
FIG. 5 illustrates a car driving over the R.S.I.S and a digital image being seen from a standoff distance by a security guard.

FIG. 5 shows how to use the system for standoff undercarriage inspections. 500 shows the chassis under-carriage unit 200 being driven over and the image of the under carriage of the vehicle is being transmitted 501 by transmitter 201 and received at the other end of the stand-off distance by receiver 202. From there it is shown on the active screen 503 and is inspected a safe distance away 502 by security officer 105.

Figure 6:
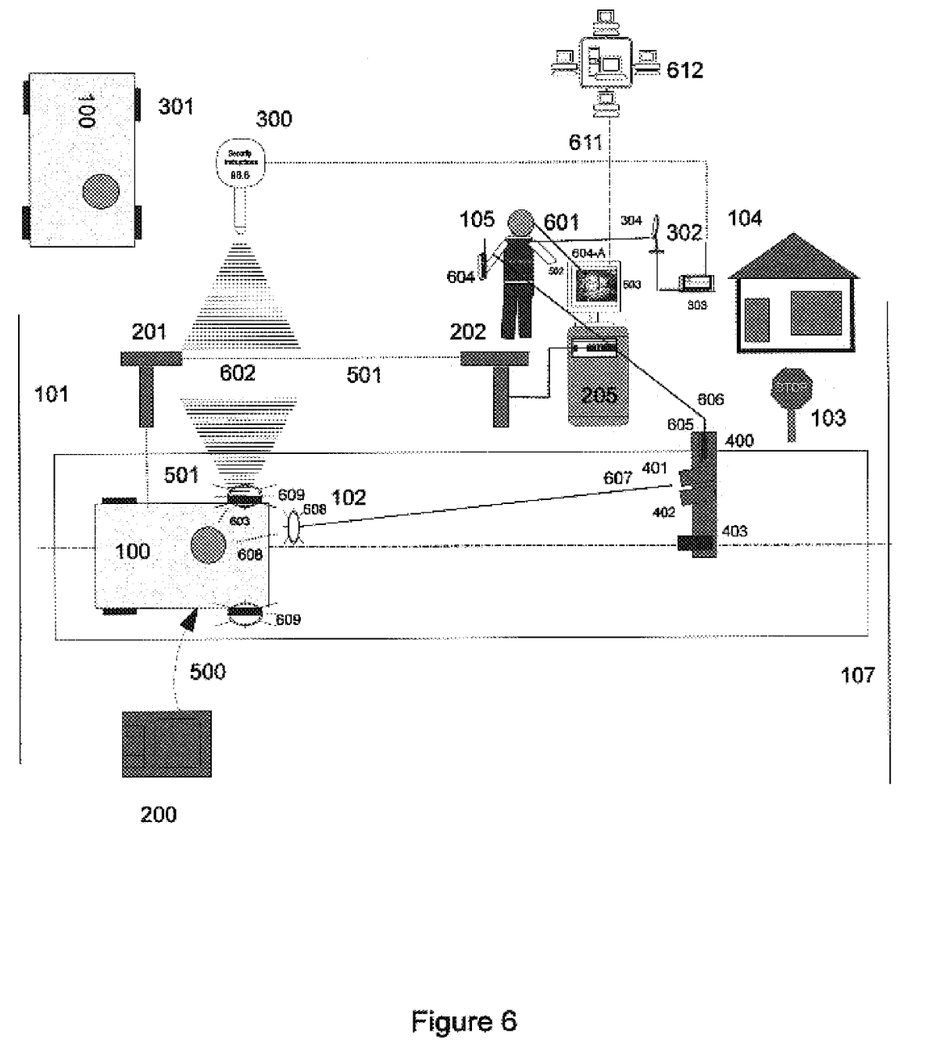
FIG. 6 illustrates a security guard spotting a suspicious item under the car signaling the car to stop via a radio broadcast to the car radio as well as by the long range laser traffic signal red "STOP" light.

Reference is now made to FIG. 6 which shows the action security officer 105 goes through when he spots a suspicious item 604-A on the screen 503. Upon spotting the suspicious item security officer 105 activates remote control (Standard Linear transmitter) 604 which sends a wireless signal 606 to receiver 605 (Standard Linear receiver and relay) which turns on the long range RED laser signal "STOP" light 607 which is seen at the other end of the stand-off distance as 608. At the same time security guard 105 announces, via microphone 304 and then through radio transmitter 303 and on through air wave 302 an announcement 602 which is heard by the driver of 100 to "STOP" the car where they, are other appropriate instructions for the scenario. Highlight 609 shows the compliance of the driver as the car stops 609 quickly upon his hearing instructions 603 and seeing laser red "STOP" light 608.

Figure 7:
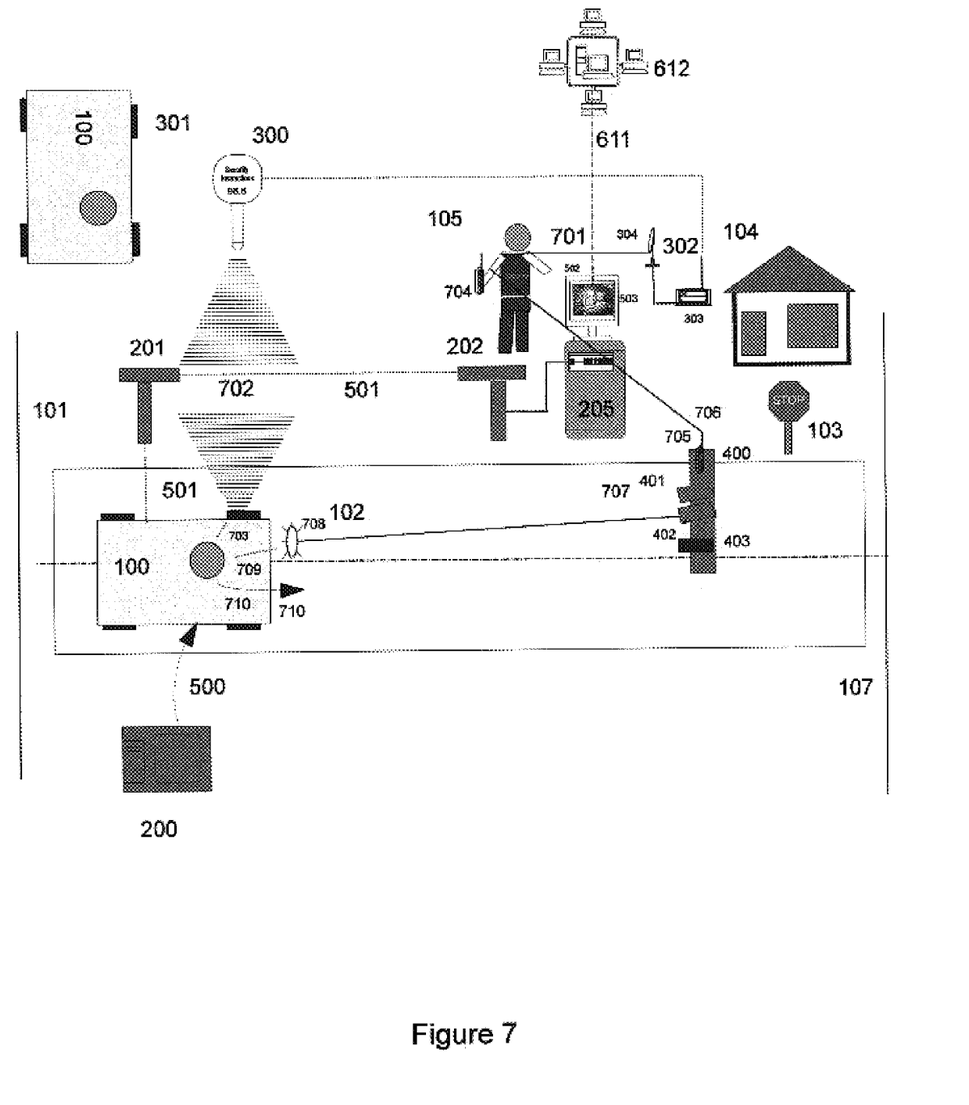
FIG. 7 illustrates reviewing the digital image of the undercarriage and clearing it as "Ok" and then signaling the car to via a radio broadcast to the car radio as well as by the long range laser traffic signal green "GO" light.

Reference is now made to FIG. 7 which shows security officer 105 reviewing the digital image footage of the under carriage, clearing the car as "OK" and then activating remote control 704 which then by wireless signal via wireless signal 706 activates a receiver and relay which triggers the green long range laser traffic signal "GO" across the stand-off distance 708 which is seen 709 by the driver of 100 as a signal to proceed. At the same time the security guard 105 is speaking instructions 701 into microphone 304 which is transmitted via radio 303 on to the driver 702 and heard as 703 as instructions to proceed forward 710.

Figure 8:
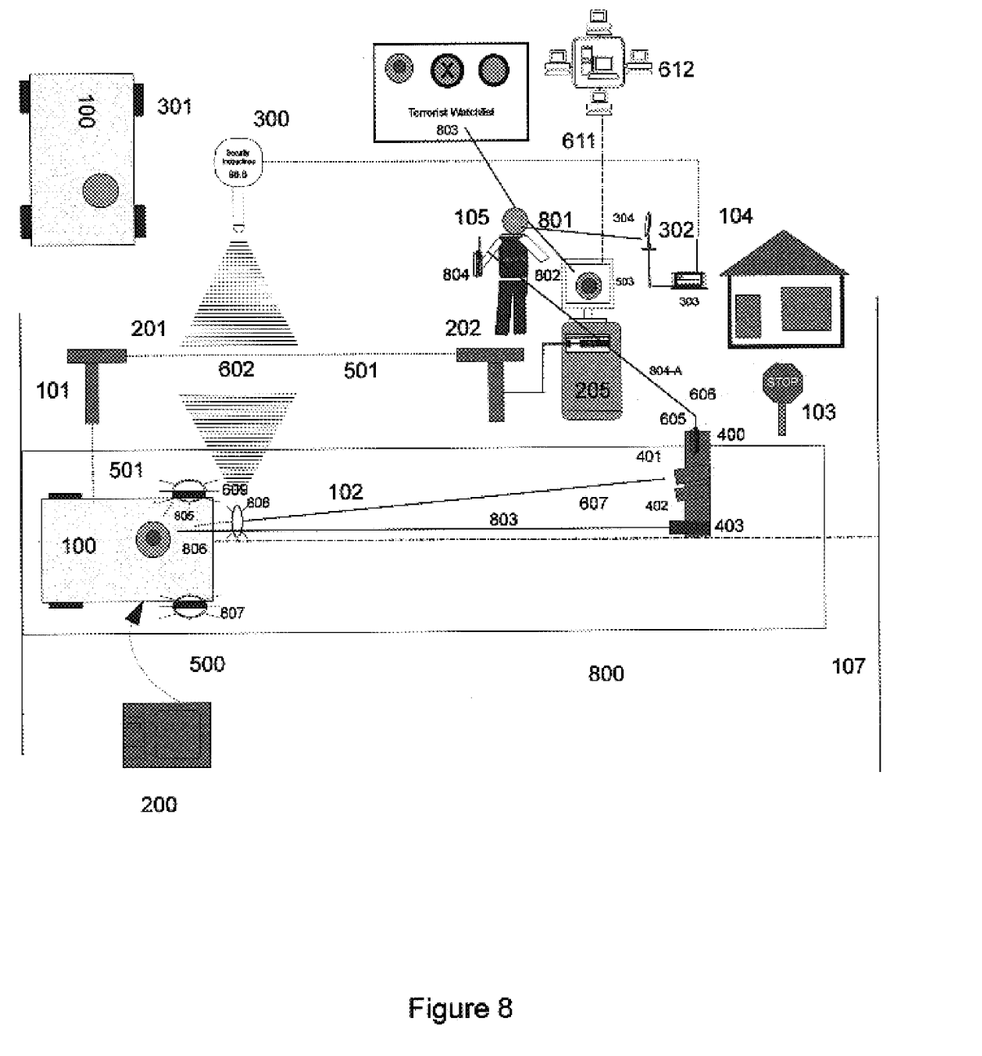
FIG. 8 illustrates a security officer using the long range camera to monitor approaching drivers and spotting a match against a known terrorist watch list, immediately signals the vehicle to stop via a radio broadcast to the vehicles approaching as well by using the long range laser traffic signal red "STOP" light.

Reference is now made to FIG. 8 which shows the long range camera system portion of the R.C.I.S. system in use. The long range camera 403 is shown focused on the driver of car FIG. 8—100 which shows up on monitor screen 503 and is noticed 802 by security officer 105 as matching a wanted terrorist on a terrorist watch list 803. He then by procedure, activates the remote control for a terrorist alert which sends a signal to relay receiver 605 which activates the long range laser "RED" light signal which signals the driver to "STOP" 808 and at the same, time an e-mail, triggered by a wireless receiver in DVR-Computer unit 205 is sent offsite to other law enforcement personnel 612. via the internet for their review and response of the situation. The action of security guard 105 triggering a terrorist watch list match also initiates a pre-recorded radio announcement 602 that orders vehicles in line to stop immediately 807.

Figure 9:
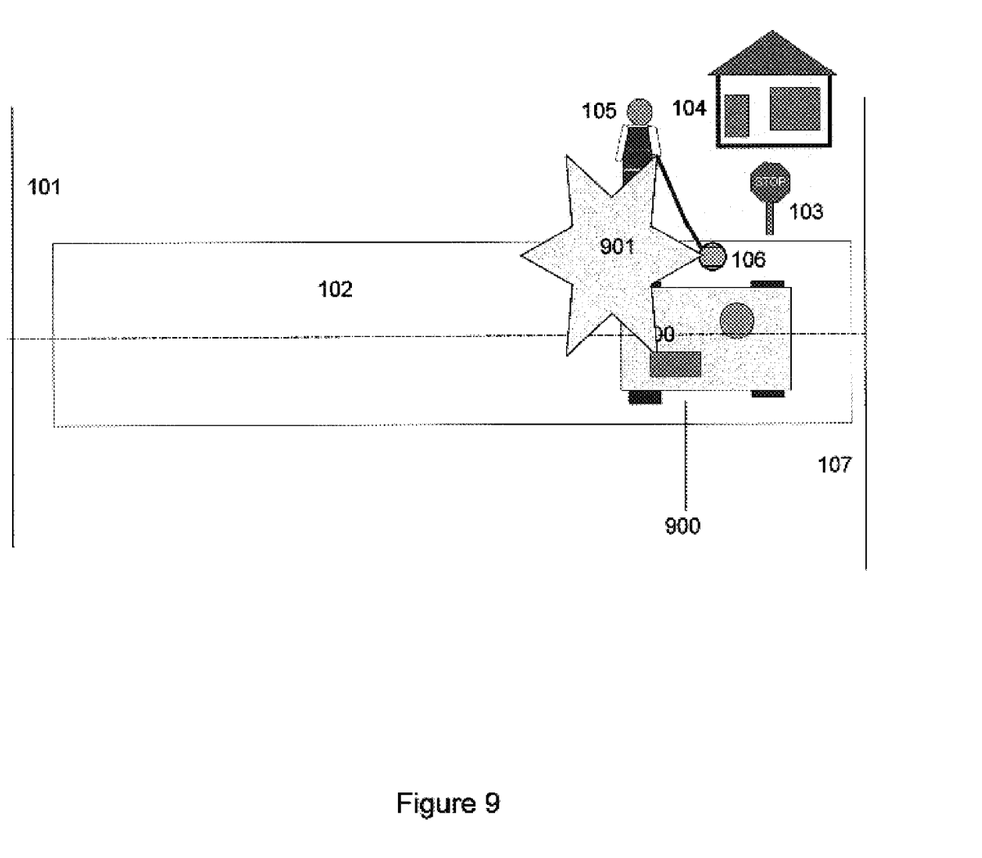
FIG. 9 Illustrates a prior art method of vehicle inspection resulting in an explosion at checkpoint due to not having a stand off inspection system in place such as shown in the present invention.

FIG. 9 Illustrates a prior art method of vehicle inspection using a mirror on a stick resulting in an explosives 900 set off 901 at checkpoint 104 due to not having a stand off inspection system and proper standoff distance 107 and 101 in place such as shown in the present invention.

Figure 10:
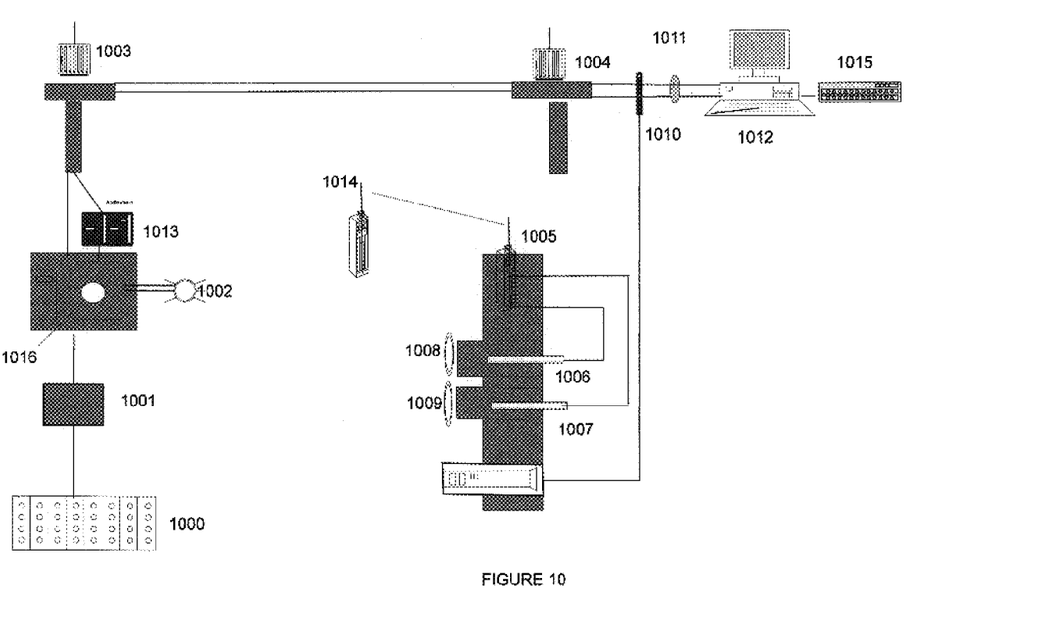
FIG. 10 Shows additional images and exploded views of the components of the R.C.I.S system.

FIG. 10 shows detailed images of the system starting with 1000 which is a commercially available solar panel which supplies a battery system 1001 that supplies power to the undercarriage scanner that is triggered on, by motion sensor 1016 when a vehicle passes over it, which limits the power draw when there are no vehicles over the unit. 1013 is commercially available radiological detector which upon activation sends an audible alarm to transmitter 1003 and is received by receiver 1004 which is then sent as audio signal via video card 1010 (GV 600 or equivalent) that is regulated by software 1011 GV-600 software onto computer 1012 or DVR 1015 as needed. The long-range camera supplies a second video image of occupants a stand-off distance away. And feeds into video card 1010 as well. Remote control 1014 transmits a signal to receiver relay 1005 for powering up red laser 1006 which is optically enlarged for optimum viewing at a stand-off distance by approaching drivers by lens 1008— (available from many commercial sources). 1009 does the same as 1008 for the green light laser 1007 which signals long range, for cars to advance forward.

FIGS. 1-10 show the entire system, component structure and component variations, including a suggested housing, that would enable a person skilled in the art, to make and use the invention without extensive experimentation.

While the present invention has been described with reference to the preferred embodiments, those skilled in the art will recognize that numerous variations and modifications may be made without departing from the scope of the present invention. Accordingly, it should be clearly understood that the embodiments of the invention described above are not intended as limitations on the scope of the invention, which is defined only by the following claims.

What is claimed is:

1. A stand-off vehicle security checkpoint machine and wireless audio/video communications system comprising:

an automatic digital video vehicle undercarriage image scanner for conducting remote video inspections of vehicles' under carriage as the vehicles pass over it;

a means of wirelessly transmitting said scanned under carriage digital video images of said vehicles undercarriage a safe stand-off distance away;

a digital image storage system for the storage of said scanned digital images of the undercarriage for a on-the-spot review or later review by a security officer;

a network interface system capable of enabling remote viewing of the gathered images by security or law enforcement agency personnel via a network LAN or WAN system;

a radio transmitter and microphone capable of playing a pre-recorded message in real-time instructing oncoming vehicles to follow specific security procedures before approaching a security checkpoint via their car radio and further capable of communicating real-time warnings to oncoming vehicles to stop before approaching any closer to a security checkpoint via their car radio;

a housing and tower for supporting long range traffic signal communications components further wherein said housing and tower comprising a green laser light, power supply and lens arrangement system for sending a green long distance "Go" signal light a half mile or more to signal oncoming traffic approaching a security checkpoint further comprising a red laser light, power supply and lens arrangement for sending a red, long distance warning "Stop" signal light a half a mile or more to signal oncoming traffic approaching a security checkpoint;

including in said tower a long range camera system that allows a close up inspection of vehicles approaching a security checkpoint to note suspicious reactions or to identify the occupants;

a remote control security alert activation transmitter system for initiating a warning system to vehicles approaching a checkpoint;

a remote control security alert receiver and relay system for triggering long range red laser traffic signal "Stop" light warnings to be initiated to vehicles approaching a security checkpoint further being operable for triggering a prerecorded radio message announcing an audible warning to approaching vehicles to halt immediately further being operable for registering a positive match against a terrorist watch list for initiating a warning system to vehicles approaching a checkpoint further being operable for triggering a prerecorded radio message announcing to a car matching a watch list description to halt immediately.

* * * * *